United States Patent [19]

Holley

[11] Patent Number: 4,550,899
[45] Date of Patent: Nov. 5, 1985

[54] PNEUMATIC SPRING

[75] Inventor: David M. Holley, Whitmore Lake, Mich.

[73] Assignee: Power Components Inc., Detroit, Mich.

[21] Appl. No.: 415,727

[22] Filed: Sep. 7, 1982

Related U.S. Application Data

[63] Continuation-in-part of Ser. No. 180,133, Aug. 21, 1980, abandoned.

[51] Int. Cl.⁴ ............................ F16F 9/02; F16F 9/34
[52] U.S. Cl. ................................. 267/119; 137/102; 267/64.28; 267/130
[58] Field of Search ............... 267/64.11, 64.25, 64.28, 267/113, 119, 124, 127, 130; 188/322.11; 137/102; 222/249; 92/52, 53, 107; 91/442

[56] References Cited

U.S. PATENT DOCUMENTS

| 183,074 | 10/1876 | Smith | 267/64.11 |
|---|---|---|---|
| 1,596,445 | 8/1926 | Morinelli | 267/64.11 |
| 2,736,466 | 2/1956 | Rodth | 222/249 |
| 3,034,527 | 5/1962 | Hennells | 137/102 |
| 3,101,194 | 8/1963 | Hennells | 267/119 |
| 3,168,853 | 2/1965 | Prince | 92/107 |
| 3,371,582 | 3/1968 | Schmidt | 92/52 |
| 3,379,430 | 4/1968 | Hennells | 267/64.25 |
| 3,451,667 | 6/1969 | Anderson | 267/119 |
| 3,511,491 | 5/1970 | Kraft | 267/119 |
| 3,519,011 | 7/1970 | Pennanen | 137/102 |

Primary Examiner—Bruce H. Stoner, Jr.
Assistant Examiner—Richard R. Diefendorf
Attorney, Agent, or Firm—Barnes, Kisselle, Raisch, Choate, Whittemore & Hulbert

[57] ABSTRACT

A pneumatic spring for use in absorbing an external force by compressing gaseous fluid trapped therein. The pneumatic spring includes internal valves for recharging and for relieving excessive pressure. In one form, the pneumatic spring comprises an outer housing defining an open-ended outer cylinder and an inner cylinder slidingly and sealingly positioned in the outer cylinder. The inner cylinder has a cylindrical side wall and end walls and a rod extends from the inner end wall of the outer cylinder through the inner end wall of the inner cylinder. A piston is fixed on the rod within the inner cylinder, thereby defining a first chamber between the inner end of the outer cylinder and the inner end wall on the inner cylinder and a second chamber between the piston on the rod and the outer end wall of the inner cylinder. The chambers are isolated from one another. Gaseous fluid under pressure is provided to each of the chambers independently of the other whereby when a force is applied to move the inner cylinder axially inwardly of the outer cylinder, the pressures in the two chambers are built up independently of one another. In another form, the pneumatic spring comprises an open-ended outer cylinder and an open-ended inner cylinder slidingly and sealingly positioned within the outer cylinder with the valves in the end wall of the outer cylinder.

3 Claims, 6 Drawing Figures

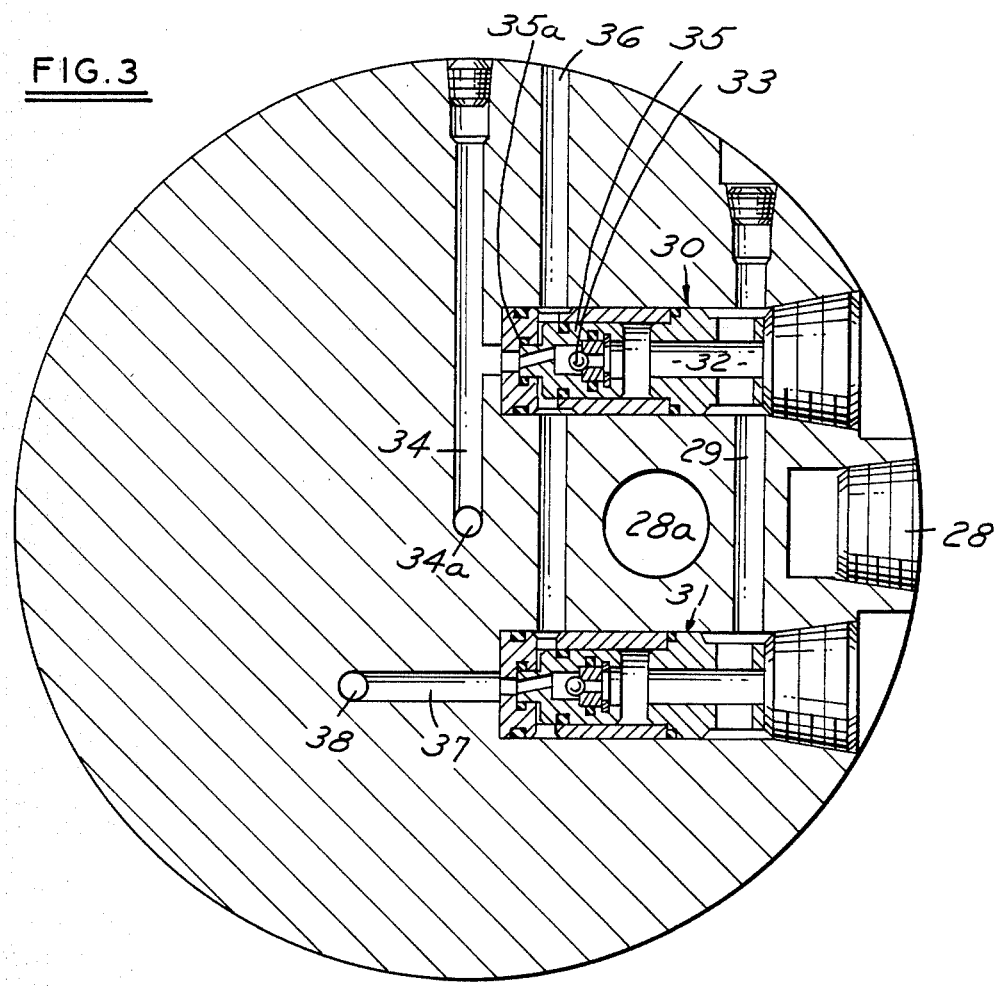
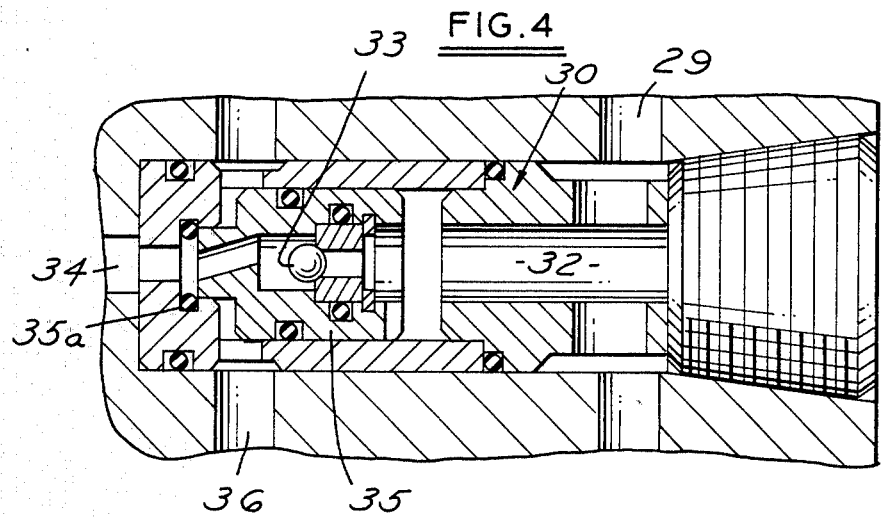

PNEUMATIC SPRING

This application is a continuation-in-part of U.S. application Ser. No. 180,133 filed Aug. 21, 1980, now abandoned.

BACKGROUND AND SUMMARY OF THE INVENTION

This invention relates to pneumatic springs which are utilized in lieu of mechanical springs for absorbing the force of movement of two bodies as can occur in use to cushion the movement of one die with respect to another as in the clamping of a workpiece in a press for forming sheet metal parts. Typical prior art of pneumatic springs of this type are shown in the U.S. Pat. Nos. 3,101,194, 3,281,138, and 3,379,430.

Among the objectives of the present invention are to provide a pneumatic spring which will effectively cushion the forces; which provides two cushioning chambers which are independent of one another; and which includes chambers that will function independently of one another so that if there is leakage with respect to one chamber, the cushioning action of the other chamber will not be affected and which is easily maintained.

In accordance with the invention, the pneumatic spring comprises an outer housing defining an open-ended outer cylinder, and an inner cylinder slidingly and sealingly positioned in the outer cylinder. The inner cylinder has a cylindrical side wall and end walls. A rod extends from the inner end wall of the outer cylinder, and a piston is fixed on the rod within the inner cylinder, thereby defining a first chamber between the inner end of the outer cylinder and the inner end wall on the inner cylinder and a second chamber between the piston on the rod and the outer end wall of the inner cylinder. The chambers are isolated from one another, and valve means provide gaseous fluid under pressure to each of the chambers independently of the other whereby when a force is applied to move the inner cylinder axially inwardly of the outer cylinder, the pressures on the two chambers are built up independently of one another. In another form, the pneumatic spring comprises an open-ended outer cylinder and an open-ended inner cylinder slidingly and sealingly positioned within the outer cylinder with the valves in the end wall of the outer cylinder.

DESCRIPTION OF THE DRAWINGS

FIG. 3 is a sectional view taken along the line 3—3 in FIG. 1.

FIG. 4 is a sectional view on an enlarged scale of a portion of the apparatus shown in FIG. 3.

DESCRIPTION

Figure 1:
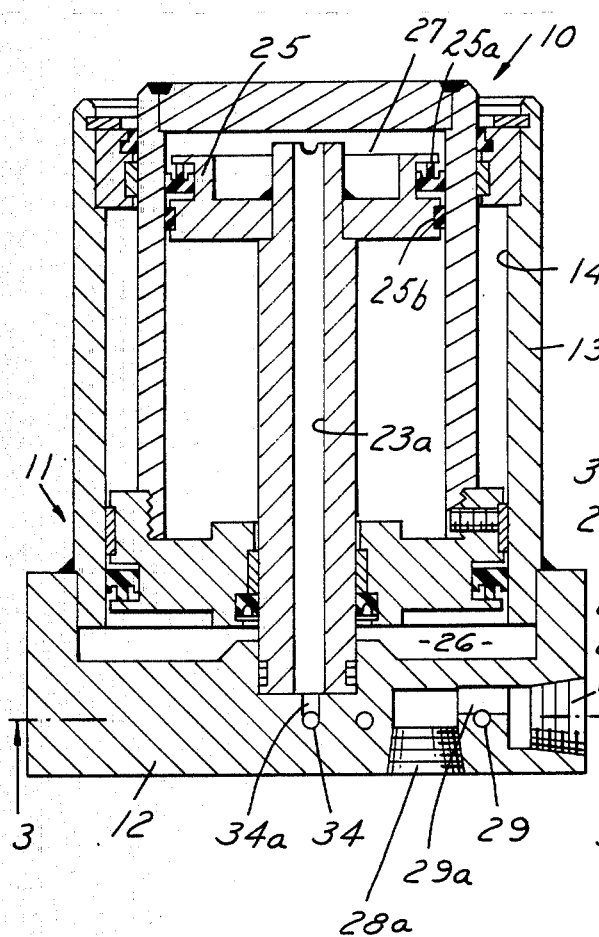
FIG. 1 is a sectional view of a pneumatic spring embodying the invention.

Referring to FIG. 1, the pneumatic spring embodying the invention is intended for use, for example, in absorbing the energy of two dies moving toward one another in a press to grip the sheet metal workpiece and prevent it from slipping.

Figure 2:
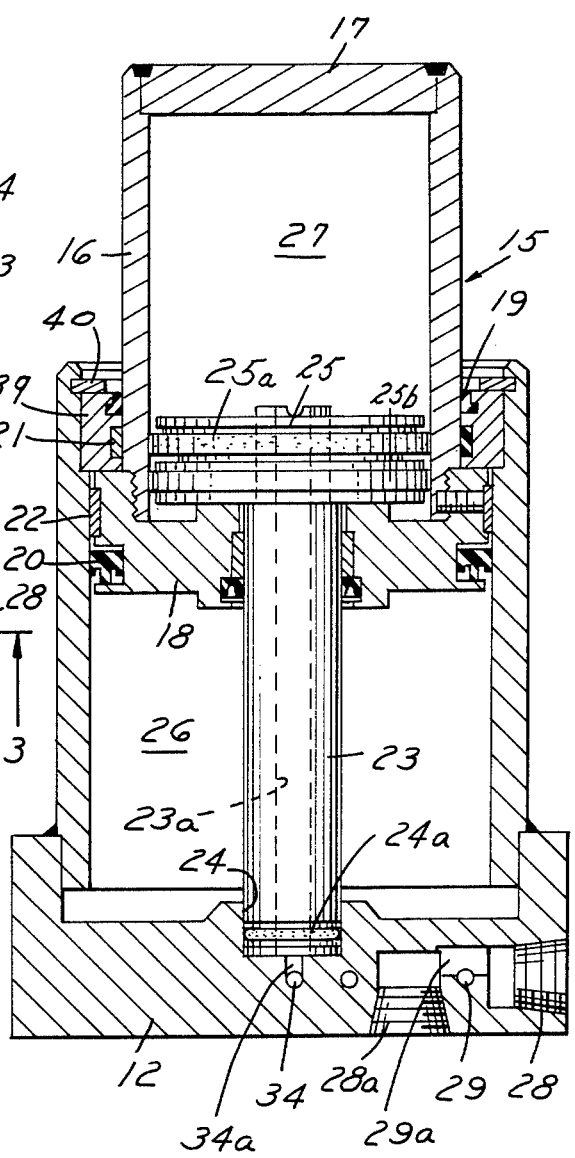
FIG. 2 is a similar view showing the parts in a different operative position.

As shown in FIGS. 1 and 2, the pneumatic spring 10 comprises a housing 11 including a base 12 and a cylindrical wall 13 defining an outer open ended cylinder 14. A second inner cylinder 15 having a cylindrical wall 16, a closed outer end wall 17, and an inner end wall 18 is reciprocable within the outer cylinder 14 with seals 25a, 20 providing a fluid tight seal and bearing pads 21, 22, 25b facilitating the movement. A rod or shaft 23 has one end extending into an opening 24 in the base 12 and sealed by a seal 24a and a piston 25 fixed on the other end thereof within the chamber of the inner cylinder 15. Thus, the apparatus defines a first chamber 26 between the inner end wall 18 of the inner cylinder 15 and wall 12 of the outer cylinder 14 and a second chamber 27 between the outer end wall 17 of the inner cylinder 15 and piston 25.

Provision is made for supplying gaseous fluid under pressure to each of the chambers 26, 27 independently of one another and comprises a single radial inlet passage 28 that extends through a passage 29a to a transverse passage 29 to valves 30, 31. Alternatively an inlet 28a through the base 12 to passage 29a may be used. One inlet 28, 28a is plugged when the other is used. Each valve 30, 31 is substantially identical in construction and comprises a body positioned in a chamber and having a passage 32 communicating with the passage 29, the end of which is adapted to be closed by a floating ball 33 functioning as a check valve so that when gaseous fluid under pressure is applied, the ball moves away from its seat to permit flow to a passage 34 and, in turn, in case of the valve 30, to an axial passage 34a through an opening 23a in the rod 23 to chamber 27. The ball 33 functions in a pilot valve 35 movable axially so that when the pressure in the chamber 27 exceeds a predetermined value, the valve 35 is moved away from its seat 35a, permitting the gaseous fluid to be vented to the atmosphere through passage 36.

Valve 31 functions in a similar manner to permit flow to passage 37 and 38 into chamber 26 and out of chamber 26 when the pressure exceeds a predetermined value, to the passage 36.

In use, a pneumatic spring is supported so that it is generally in the position shown in FIG. 2 when the chambers 26, 27 are charged. As the dies move together, the cylinder 15 engages a clamping part of the die which hold the sheet metal workpiece and as the dies move closer and closer together, a greater and greater force is applied, holding the workpiece in position. Since the chambers 26, 27 are independent of one another, the pressures in the chambers differ but the cumulative effect is a greater sealing force.

In the event that one or the other of the seals 25a, 20 fails, only the affected chamber will lose fluid and the other chamber will continue to function, maintaining a more limited but functional operation of a pneumatic spring. The construction permits ready disassembly of the various parts for replacement of the seals and bearings as may be required. Thus, the ring 39 which supports the wiper and bearing 21 is held in position by a snap ring 40 and removal of the snap ring 40 permits not only the ring 39 to be removed but also the cylinder 15 and the associated lower portion thereof with the seal 20 and bearing 22. This will simultaneously remove the shaft 23 which is slidingly positioned with the seal 24a in opening 24.

Figure 5:
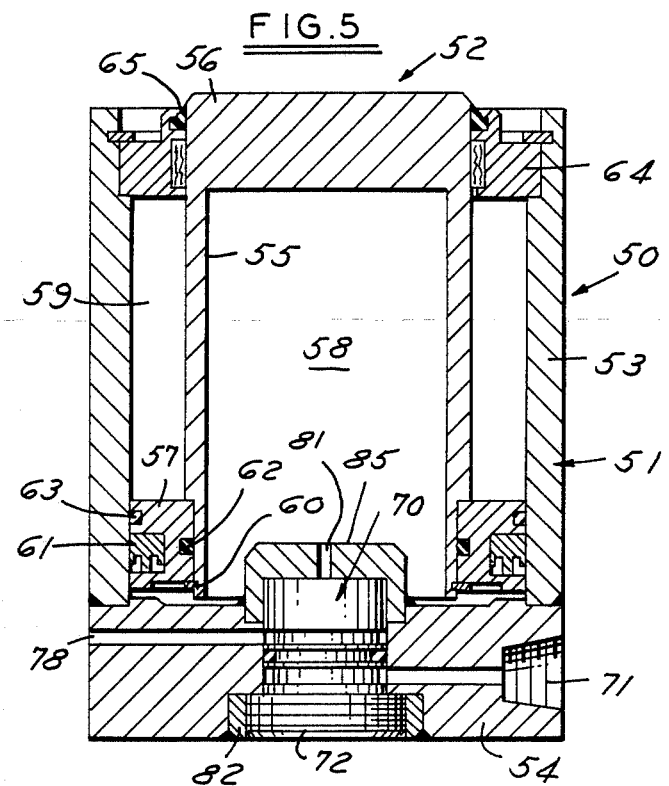
FIG. 5 is a sectional view of a modified pneumatic spring.
Figure 6:
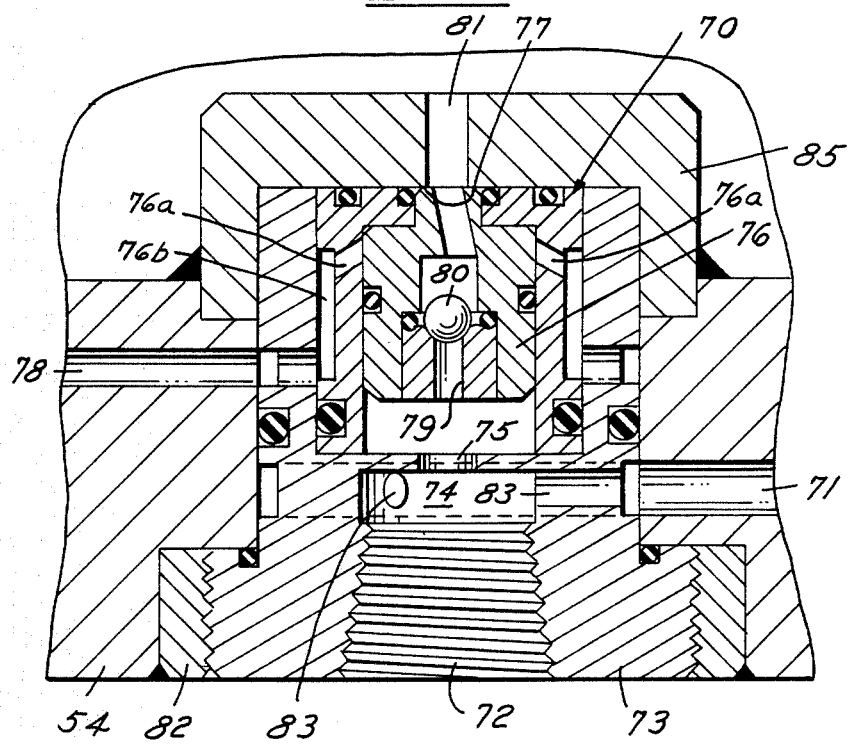
FIG. 6 is a fragmentary sectional view on an enlarged scale of a portion of the pneumatic spring shown in FIG. 5.

In the form of the invention set forth in FIGS. 5 and 6, the pneumatic spring 50 comprises an outer cylinder 51 and an inner cylinder 52 slidingly and sealingly positioned within the outer cylinder. The outer cylinder 51 includes a cylindrical side wall 53 and a base or end wall 54. The inner cylinder 52 includes a cylindrical side wall 55 and an end wall 56. A piston 57 on the inner free end of wall 55 divides the interior into chambers 58, 59 and is retained in position by snap ring 60. Seals 61, 62 are provided as well as a bearing ring 63. Adjacent the outer end of wall 53, a head 64 on wall 53 is provided and a seal 65 extends toward the outer surface of wall 55.

A combined inlet and pressure relief valve assembly is provided in the end wall 54 of the outer cylinder to provide for recharging or replenishing the gaseous fluid such as air and for relieving the excessive pressure. A single radial inlet passage 71 extends to valve 70. Alternatively an axial inlet 72 in the body 73 of the valve 70 may be used. One inlet 71, 72 is plugged when the other is used. The valve 70 is of substantially identical construction as valves 30, 31 and comprises a body 72 positioned in a chamber and having passages 74, 75 communicating with inlets 71. A pilot valve 76 is movable axially in body 73 so that when the pressure in the chamber 58 exceeds a predetermined value, the valve 76 is moved away from its seat 77, permitting the gaseous fluid to be vented to the atmosphere through passages 76a in valve body 73 and circumferential passage 76b to passage 78. The end passage 79 in pilot valve 76 is adapted to be closed by a floating ball 80 functioning as a check valve so that when gaseous fluid under pressure is applied, the ball 80 moves away from its seal to permit flow to a passage 81 to chamber 58.

Body 73 is preferably threaded into a ring 82 fixed in end wall 54 and O-rings provide seals as needed. Where inlet 71 is used communication is provided by radial passages 83 to passage 74.

The body 73 preferably extends into a cylindrical cavity of a cap 85 fixed on the end wall 54 and passage 81 is provided in cap 85. The end of body 73 is flush with the lower surface of wall 54.

In use, a pneumatic spring is supported so that it is generally in the position shown in FIG. 5 when the chambers 58, 59 are charged. As the dies move together, the cylinder 52 engages a clamping part of the die which hold the sheet metal workpiece and as the dies move closer and closer together, a greater and greater force is applied, holding the workpiece in position.

I claim:

1. A pneumatic spring for absorbing an external force by compressing a gaseous fluid trapped therein comprising
    an outer housing comprising a base wall and a side wall defining a first cylinder having an open end,
    a second cylinder slidingly and sealingly positioned in the first cylinder,
    seal means between said cylinders,
    said second cylinder having a cylindrical side wall and inner and outer end walls,
    a rod extending from the base wall of the first cylinder through the inner end wall of the second cylinder,
    a piston fixed on the rod within the second cylinder,
    thereby defining a first chamber between the base wall of the first cylinder and the inner end wall of the second cylinder and a second chamber between the piston on the rod and the outer end wall of the second cylinder,
    said chambers being isolated from one another and being normally charged with gaseous fluid such that fluid will not flow between said chambers during operation,
    said base wall having a single inlet and passages selectively connected to said inlet for supplying fluid under pressure to each of said chambers,
    a valve in each passage entirely within said base wall providing gaseous fluid under pressure to each passage such that the chambers remain isolated from one another whereby when a force is applied to move the second cylinder axially inwardly of the first cylinder, the pressures in the two chambers are built up independently of one another,
    each said valve including check valve means and pressure relief valve means for relieving the pressure in its respective chamber.

2. The pneumatic spring set forth in claim 1 wherein each said valve comprises a ball check valve for controlling the flow of fluid into each said chamber and a shuttle valve for controlling excessive pressure in its chamber, said ball check valve being positioned in such shuttle valve.

3. A pneumatic spring for absorbing an external force by compressing a gaseous fluid trapped therein comprising
    an outer housing comprising a base wall and a side wall defining a first cylinder having an open end,
    a second cylinder slidingly and sealingly positioned in the first cylinder,
    seal means between said cylinders,
    said second cylinder having a cylindrical side wall and inner and outer ends walls,
    a rod extending from the base wall of the first cylinder through the inner end wall of the second cylinder,
    a piston fixed on the rod within the second cylinder,
    thereby defining a first chamber between the base wall of the first cylinder and the inner end wall of the second cylinder and a second chamber between the piston on the rod and the outer end wall of the second cylinder,
    said chambers being isolated from one another and being normally charged with gaseous fluid such that fluid will not flow between said chambers during operation,
    said base wall having a first inlet and passages selectively connected to said inlet for supplying fluid under pressure to each of said chambers,
    a valve in each passage providing gaseous fluid under pressure to each passage such that the chambers remain isolated from one another whereby when a force is applied to move the second cylinder axially inwardly of the first cylinder, the pressure in the two chambers are built up independently of one another,
    each said valve including check valve means and pressure relief valve means for relieving the pressure in its respective chamber,
    each said valve comprising a ball check valve for controlling the flow of fluid into its respective chamber and a shuttle valve for controlling excessive pressure in its respective chamber, said ball check valve being positioned in such shuttle valve,
    said first inlet extending from the bottom of said base wall, said base wall including a second inlet extending from the side of said base wall and communicating with said passages such that one of the inlets can be used selectively by obstructing the other inlet.

* * * * *